United States Patent [19]

Sears, Jr. et al.

[11] 4,287,143
[45] Sep. 1, 1981

[54] CLOTH MOLDING PROCESS

[75] Inventors: I. Weir Sears, Jr., Davenport, Iowa; Raoul Quertain, Brussels, Belgium

[73] Assignee: Sears Manufacturing Company, Davenport, Iowa

[21] Appl. No.: 83,537

[22] Filed: Oct. 10, 1979

Related U.S. Application Data

[63] Continuation-in-part of Ser. No. 22,592, Mar. 19, 1979.

[51] Int. Cl.$^3$ .............................................. B29D 27/04
[52] U.S. Cl. .................................. 264/46.8; 264/46.6; 264/320; 264/327
[58] Field of Search ................. 264/46.8, 46.6, 45.3, 264/320, 327; 428/425

[56] References Cited

U.S. PATENT DOCUMENTS

| | | | |
|---|---|---|---|
| 3,652,359 | 3/1972 | Decker | 156/224 |
| 3,748,217 | 7/1973 | May et al. | |
| 3,933,548 | 1/1976 | Anderson et al. | |
| 3,941,633 | 3/1976 | Wang et al. | 428/425 X |
| 3,954,537 | 5/1976 | Alfter et al. | 264/46.8 X |
| 4,060,280 | 11/1977 | van Loo | 264/46.6 X |
| 4,089,919 | 5/1978 | Sanson | 264/46.6 |

FOREIGN PATENT DOCUMENTS

| | | |
|---|---|---|
| 809184 | 3/1969 | Canada . |
| 2227143 | 12/1973 | Fed. Rep. of Germany . |
| 1227760 | 4/1971 | United Kingdom . |

OTHER PUBLICATIONS

Corbman, Bernard P., "Textiles: Fiber to Fabric", Fifth Edition, New York, McGraw-Hill, ©1975, pp. 75, 76, 390 and 391.

*Primary Examiner*—Philip Anderson
*Attorney, Agent, or Firm*—Cushman, Darby & Cushman

[57] ABSTRACT

A method of molding cloth. A special multi-layer cloth is first preheated and then drawn into a heated mold by means of a vacuum between the cloth and the mold. The cloth includes a fabric layer having a heat-fixable fiber, a polyurethane foam layer and a polyvinyl chloride film layer bonded together. The cloth is preheated to at least the greater of the set temperatures of the fabric layer and the polyvinyl chloride film. The mold is heated to at least the same temperature. After the cloth has conformed to the contours of the mold, the cloth is transferred to a cooler mold. The steps of heating the cloth in the mold and then cooling the cloth in the cooler mold sets the stitch of the fabric to the contours of the mold. Polyurethane foam may then be poured into the mold and allowed to expand to form a seat cushion or the like.

14 Claims, 8 Drawing Figures

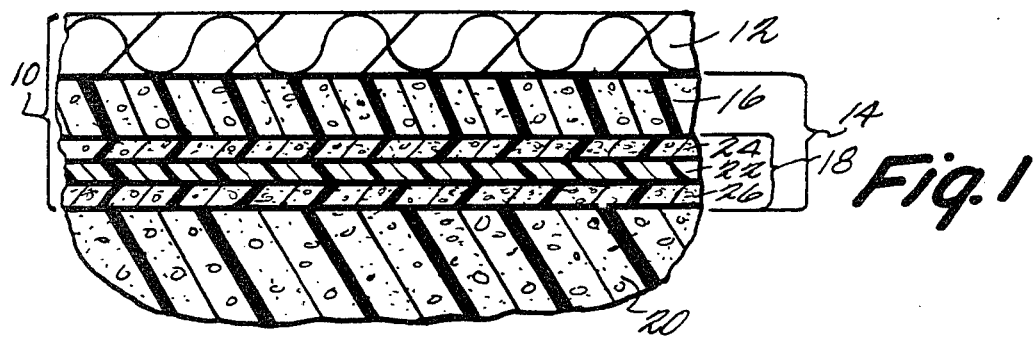
Fig. 1
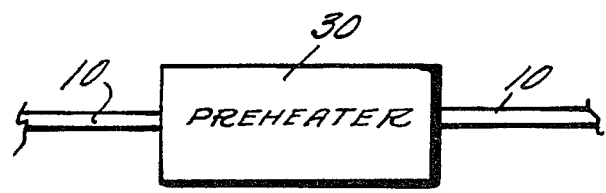
Fig. 2
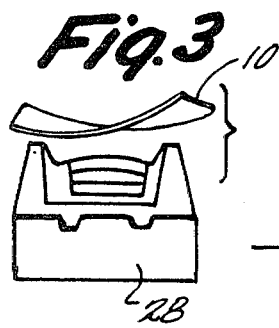 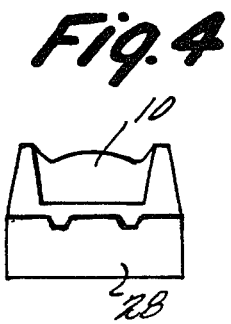 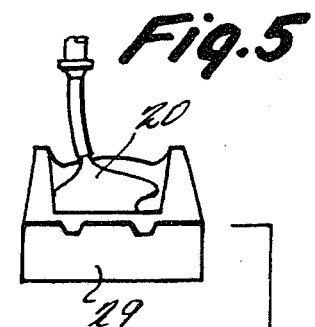
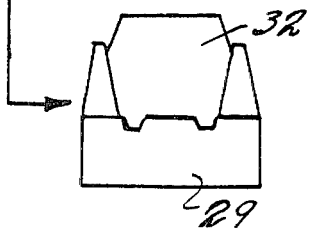 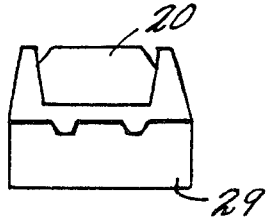 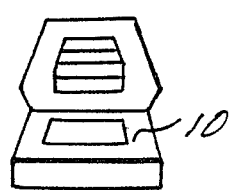

CLOTH MOLDING PROCESS

This a continuation-in-part of copending application Ser. No. 022,592, filed Mar. 19, 1979, to I. Weir Sears and Raoul Quertain, the contents of which are incorporated herein by reference.

BACKGROUND OF THE INVENTION

This invention relates to a method of molding cloth, and more particularly, to a method of molding a multi-layer, vacuum-formable cloth which may be employed as the outer covering of seat cushions, acoustical dividers and the like.

The traditional method of making upholstered seat cushions involves: (1) cutting the cover material according to an appropriate pattern; (2) sewing the cut material; and (3) stuffing the cushion. High labor costs result, since, in many situations, the cutting and sewing operations are extensive and much must be performed by hand.

To reduce the cost of manufacturing seat cushions, a molding process was devised for manufacturing seat cushions comprising a foam portion having an integral vinyl cover. The vinyl covering is first heated and then drawn into a cold mold by means of a vacuum between the vinyl and the mold. As the vinyl cools, it assumes the contours of the mold. Foam is then poured into the mold to form the integral foam portion of the seat cushion. This process significantly reduces manufacturing costs and results in a superior seat.

However, cloth has many advantages over vinyl. Specifically, cloth is water vapor permeable. Perspiration that normally collects behind a person sitting in a vinyl seat can pass through cloth and be evaporated so that cloth feels cooler during warm weather and warmer during cold weather. Furthermore, the feel of the cloth, the "hand", is much more luxurious and elegant.

To reduce the expense of cloth covered seats, attempts have been made to develop cloth molding processes similar to that described above with respect to vinyl. U.S. Pat. No. 3,954,537 to Alfter et al discloses a process for producing multi-layer sheets having a polyurethane foam layer bonded to a cross-linked polyethylene foam layer. Alfter discloses that it is particularly advantageous to join the foam layers with further layers such as fabric to form upholstery components. Alfter relies on the strength of the bond between the polyurethane foam and polyethylene foam to accomplish the molding. However, polyurethane foam in an uncured state can easily change shape. Since Alfter relies on the bonding of two foam layers, and not on the setting in some manner of the outer fabric layer, intricate detail is most likely not possible, and since polyurethane foam in an uncured state can change shape easily, it appears likely that the fabric layer would tend to return to its flat shape.

German Offenlegungsschrift No. 2,227,143 to Bayer AG, discloses a seat cushion with a textile cover and a foam core. A fabric is bonded to a polyether-urethane foam layer which in turn is bonded to a film sealing layer. This multi-layer fabric is first heated to 70° C. (158° F.) and then drawn into a mold. A soft foam is then poured into the mold to form a seat cushion.

The following patents describe methods of forming a multi-layer cloth similar to that described above:

U.S. Pat. No. 3,941,633—Wang et al (1976)
U.S. Pat. No. 3,933,548—Anderson et al (1976)
U.S. Pat. No. 3,748,217—May et al (1973)
British Pat. No. 1,227,760—Dunlop (1971)

Although the cloth molding processes described in Bayer and Alfter do work with some molds and fabrics, the applications are rather limited. For example, the Bayer Patent recites that only elastic knit fabrics may be employed. The complexity of the mold pattern is also significantly limited. In the Bayer and Alfter processes, the molded fabric will not retain the contours of more intricate or sharp mold features.

One of the problems with the prior art procedures is that the stitch of the fabric layer is not set in the shape of the mold. Therefore, the fabric layer tends to pull against the other cloth layers or the underlying foam core. Over time, details of the mold will tend to flatten.

SUMMARY OF THE INVENTION

It is particularly advantageous to set the stitch of the fabric layer in the mold. This is accomplished by employing a mold heated to at least the fabric set temperature when the cloth is drawn into the mold. The heated cloth is then transferred and made to conform to a mold having a temperature below the fabric set temperature. By this process the fabric stitch is set to the precise contours of the mold.

In this invention a cloth having a fabric layer bonded to an elastic, preferably thermoplastic, composition layer is drawn into the mold by the vacuum between the cloth and the mold. The mold has been or is then heated to a temperature sufficient to set the stitch of the fabric. The cloth is then transferred to and drawn into an identically shaped mold having a lower temperature (also at part of the setting process) after which foam is poured into the cooler mold. The other portion of the mold is positioned and the poured-in-place foam is permitted to expand. A finished seat cushion is then extracted from the mold.

Since the first mold is heated to the stitch setting temperature and since the cloth is cooled in the second mold, the fabric stitch is heat set to the shape of the mold. Therefore, the fabric layer works together with the underlying elastic composition layer so that the cloth or cushion maintains the shape of the mold after removal. In addition, since a hot mold is employed, and the cloth is pressed against the mold with a fair amount of pressure, the molding process tends to finish the cloth.

The use of cloth, and particularly the cloth molding process of the present invention, results in numerous advantages. Cushion shapes that had heretofore been impossible, particularly in sewn construction, are easily obtained by the process of the present invention. The possible shapes include complex curves, concave and convex portions, tufts, and the simulation of tufting buttons. Many of these shapes have not even been possible with previous cloth molding processes.

In addition to conforming to the more gradual contours of the mold, the cloth of the present invention will also conform to fine mold details. Thus, the surface of the mold may be patterned with a known cloth texture or even a texture that is impossible to weave or knit. An inlay can even be inserted in the mold to either give cloth different textures, or to add additional contours to a basic mold design.

Labor savings are achieved with the cloth molding process of the present invention, because the cloth is processed and shaped much more quickly than in the traditional cutting and sewing process. Shapes commonly found in tufted furniture require yards of sewing. The assembly of tufts and tufting buttons also require extensive labor. With the present invention, they can be vacuum formed instantaneously, complete with simulated tufting buttons and poured-in-placed foam.

The present invention makes possible the exact duplication of shapes. The inaccuracies of sewn construction are eliminated.

The integrity of the cloth is improved by this process since the cloth is held in place by a sandwich construction, thus eliminating the creasing or puckering of material which occurs in upholstered furniture after use.

The durability of the resulting cushion is improved because the cloth composite and the polyurethane poured-in-place foam act as a unit. This improves the life of the cover, because it flexes with the foam rather than independent of it.

The present invention may be employed to mold cloth for any conceivable application. Such applications include automotive vehicle seats, aviation seats, and dental chair cushions, drafting stool cushions, other seating applications; padding for headboards, baby carriages, bar fronts, church kneelers, boots, school buses, and hand rails; and paneling and wall coverings for elevators, offices, tables, and kitchen cabinets.

If rigid or structural foam is employed as the poured-in-place foam, many advantages result. If the structural foam is employed as an office chairpan, it would be possible to use the method outlined above to cover the pan. The arm rest in chairs, automotive door side panels and the like could be molded with the covering cloth in one easy step. Similarly, office furniture molded into the wall might be a structural foam frame covered with the cloth as molded by the present invention.

BRIEF DESCRIPTION OF THE DRAWING

These and other objects and advantages of the invention will become more apparent and more readily appreciated from the following detailed description of the presently preferred exemplary embodiment of the invention taken in conjunction with the accompanying drawing, of which:

FIG. 1 is a cross section of the product of the present invention;

FIG. 2 is an illustration of the preheating step of the present invention;

FIG. 3 is an illustration of the cloth insertion step of the present invention;

FIG. 4 is an illustration of the heating step of the present invention;

FIG. 5 is an illustration of the foam pouring step of the present invention;

FIG. 6 is an illustration of the curing step of the present invention;

FIG. 7 is an illustration of the cushion extraction step of the present invention; and FIG. 8 is an illustration of the resulting product of the present invention.

DESCRIPTION OF THE PREFERRED EMBODIMENT

I. The Cloth

An important aspect of the present invention is the particular type of cloth which is employed. Referring now to FIG. 1, cloth 10 includes fabric layer 12 bonded to elastic composition layer 14. Fabric layer 12 is the exterior, decorative layer which enhances the appearance of the product resulting from the present invention. Also, the use of fabric enhances the thermal comfort of the product due to the air-flow through the fabric.

A. Fabric Layer

Fabric layer 12 may be either knitted or woven. Knitted fabrics may be either warp knit or circular knit, single knit or double knit. Nearly any natural, artificial or synthetic material may be employed such as wool, cotton, polyamide, polyester, vinyl chloride, vinyl chloride acrylonitrile (modacrylic) or polyacryl fibers.

Molding intricate patterns is more easily accomplished with fabrics having greater stretch. Therefore, the process is more easily performed with knitted materials than woven material since knitting produces a more elastic fabric than weaving. Polyamide, such as type 6 and type 6.6, polyester, vinyl chloride, vinyl chloride acrylonitrile copolymers, elastomer urethane and polyacryl fibers are preferable materials for weaving due to their inherent elasticity. Furthermore, the use as a ground yarn of the fabric of any of the texturized polyamide or polyester high elasticity yarns, or very high thermoplastic yarns like vinyl chloride and vinyl chloride acrylonitrile aids the molding process.

Some fabrics are more easily heat set than others. For example, polyamide, polyester, vinyl chloride, vinyl chloride acrylonitrile are more easily heat set than cotton and wool.

To maintain the maximum amount of elasticity in a fabric, it is preferred that the fabric stitch never has been thermally set. The significance and details of this aspect of molding cloth is fully disclosed in two U.S. applications, Ser. Nos. 22,593 and 22,591 to James F. Lischer and to James F. Lischer and Raoul Quertain, respectively, both entitled PROCESS FOR MOLDING CLOTH INCLUDING A FABRIC LAYER, THE STITCHES THEREOF HAVING NEVER BEEN THERMALLY SET, the contents of which are incorporated herein by reference. Many of the fabric finishing steps, such as tentering, calendering and shrinkage control heat the fabric, thus setting the stitch. The concept of setting the stitch is well known in the art and is easily measured by comparing the degree of elasticity of a fabric immediately after weaving or knitting, and again after finishing. If the fabric has become heat set during the finishing process, the elasticity is greatly reduced. Clearly, employing heat to dry a fabric (as occurs in the tentering, calendering and shrinkage control processes) sets the fabric stitch. Tensioning the fabric while it is heated increases the degree to which the stitch is set.

In addition to many of the fabric finishing steps, some dyeing processes must be avoided. In many dyeing procedures the cloth is sewn into a rope and processed under tension. It is common to heat the dye bath to approximately the boiling point of water. The material is then dried at a raised temperature. This may heat set the fabric stitch. It has been found that yarn dyeing avoids this problem since the weaving or knitting process creates elasticity in the fabric. It appears that the real problem to be avoided is setting the stitch of the fabric rather than heat setting, in some manner, the yarns from which the fabric is created.

The temperature to which a fabric may be heated before the stitch becomes set varies with the type of fabric. For example, the stitch of a polyamide fabric may become set at a temperature of 93° C. (200° F.). With some fabrics, particularly the more elastic ones, normal finishing may be employed since sufficient stretch remains in the fabric after finishing.

B. Foam Layer

In the preferred embodiment, elastic composition layer 14 includes foam layer 16 and film layer 18. Foam layer 16 must have good adhesion to both fabric 12 and film 18. Foam layer 16 is preferably any typical open microcell soft foam. The preferred embodiment employs polyester-type polyurethane foam, although other foams are suitable, such as polyester-polyether-type polyurethane. An advantage of polyester-type polyurethane foam over polyether-type polyurethane is that it has a better "memory". Polyester-type foam tends to retain the shape in which it was molded better than polyether-type polyurethane foam.

Foam layer 16 allows movement of fabric 12 relative to film 18 and prevents the rupture of film 18 that might result from elongation of cloth 10 if fabric 12 were directly attached to film 18. Obviously, if an alternative method is employed to prevent rupturing, foam layer 16 would not be necessary.

Foam layer 16 also improves the "hand" or feel of cloth 10. Since foam 16 is preferably open celled, air may circulate through the foam thus improving the thermal comfort of the seat. Neoprene foam may also be used; however, it is less desirable since it is a closed cell foam.

In the preferred embodiment, foam 16 is 1.5-6 millimeters (mm) thick and has a density of 30-60 Kg/m³. Also, foam 16 should stretch 300-400% before breaking. As the density of the foam increases, the degree to which the foam will stretch before breaking increases.

The appropriate thickness of the foam should be determined by the particular application. The foam must not be so thick as to cause intricate patterns in a design to spring back after removal from the mold. On the other hand, a thicker foam layer enhances the hand and air permeability of the cloth.

C. Film Layer

Film layer 18 may be any elastic, preferably heat-fixable, film which can adhere to both foam layer 16 and poured-in-place foam 20. Film 18 is preferably 0.03-0.7 mm thick and is able to withstand a 400% surface deformation. For the invention to work properly, the stretch limits of elastic composition layer 14 must be approximately equal to or exceeding the stretch limits of fabric 12.

The film should have a reasonably long life, must resist dry cleaning solvent, and not be affected by water, humidity or oxidizing agents.

One purpose of the film 18 is to guarantee that the cloth is air tight so that it may be drawn into the mold by a vacuum. Another purpose is to prevent poured-in-place foam 20 from penetrating through fabric 12, thus ruining the aesthetic value of the product. Furthermore, the film must resist the chemical products in the poured-in-place foam.

In the preferred embodiment, film 18 is polyvinyl chloride film. This film is closed cellular, and is well suited because it is a thermoplasatic material. However, it hardens when plasticizers in the film migrate. Newly developed polymeric plasticizers may be employed to overcome the migration problem. If polyvinyl chloride is utilized as film 18, the thickness is preferably 0.1-0.3 mm.

The polyvinyl chloride film of the preferred embodiment has the following composition (% by weight of total):
Vinyl Chloride: 50.0-55.0
Phosphate/phthalate plasticizers: 35.0-40.0
Light and heat stabilizers: 2.0
Epoxy: 0.5
Fillers/pigments: 7.5

If polyvinyl chloride is employed as film 18, it is preferable that it be coated on both sides with polyester-type polyurethane film. FIG. 1 illustrates polyvinyl chloride layer 22 coated on both sides with polyurethane film layers 24 and 26. Film layer 24 is preferably about 20 microns thick, while film layer 26 is preferably about 6 microns thick. Polyurethane film layers 24 and 26 permit bonding of polyvinyl chloride 22 to poured-in-place foam 20. Polyurethane coatings 24 and 26 also help stop the migration of plasticizers in polyvinyl chloride film 22.

Polyester-type polyurethane film may also be employed as film layer 18. This film is highly deformable with a poor memory under heat, because it is thermoplastic. These characteristics are obviously advantageous in the molding process of the present invention. It appears that a thickness of 0.2-0.6 mm is preferred. Another advantage of this film is that it is water vapor permeable, enhancing the thermal comfort of the finished product.

The major problem with this film is that pin holes tend to develop from gas bubbles created during manufacturing. This would permit poured-in-place foam 20 to penetrate through fabric 12. To avoid this problem, the film must be cured very slowly. Otherwise, the bubbles burst during molding to create pin holes.

Rubber may also be employed as film 18. The rubber must be unvulcanized and may be either natural or synthetic. The same type of rubber product that is used in bed sheeting is ideal.

The major problem with rubber film is its odor. Anti-oxidizing agents must be used. However, care must be exercised in choosing the anti-oxidizing agents since many of the agents commonly used would migrate to the adjacent foam layers over approximately one year and distort the foam. However, non-migrating oxidizing agents are well known. Blocking agents can be placed in the rubber that would break down at a predetermined temperature allowing the rubber to set or vulcanize during the molding process. When the rubber is vulcanized during the molding process, the rubber will hold the shape of the mold quite well afterwards.

Ethylene vinyl acetate copolymer (EVA) may also be employed as film 18. This film is an elastomer and exhibits good stretch and poor memory at higher temperatures. However, EVA is sensitive to high temperatures. At about 150° C. it begins to melt and form pin holes. EVA is weak in resisting abrasion. Pin holes form readily from handling. The film may be made by a rubber calendering system with which large quantities can be easily produced.

A number of other films may also be used such as neoprene film.

D. Bonding The Layers

The bonding of the varioous layers within elastic composition layer 14 and the bonding of elastic composition layer 14 to fabric 12 must be carefully performed to avoid delamination. Polyvinyl chloride film 22 and polyurethane elastomer films 24 and 26 may be applied to foam interlayer 16 by a transfer process, well known in the art. Specifically, each film is applied as a liquid, the thickness being controlled by a blade. The film is then heated to jellification temperature by infra-red lamps. A second controlled thickness is applied and heated after polyurethane foam 16 is applied, the films pass through calender rolls at room temperature, after which the film is baked under infra-red lamps. If unvulcanized rubber is employed as film 18, it is passed between calender rollers heated to a temperature less than the vulcanizing temperature.

After film layer 18 is joined to one side of foam layer 16 to form elastic composition layer 14, the opposite side of foam 16 is heated, as in a Reeves machine, and the fabric material is flame-bonded thereto. It is not preferable to join both fabric 12 and film 18 to foam 16 by flame-bonding, as this will result in a greater tendency for delamination of film layer 18.

If foam layer 16 is eliminated, film layer 18 may be glued directly to fabric 12 using, for example, acrylic glue. When film 18 is applied to foam layer 16, the foam must be relaxed and not under tension.

II. Molding Process

Cloth 10, as described above and illustrated in FIG. 1, is ideally suited for molding. Cloth 10 is first cut to size and, as illustrated in FIG. 2, preheated to a temperature greater than the temperature at which fabric layer 12 is heat set and film layer 18 loses its memory. Either radiant heat or heated air may be employed. With polyvinyl chloride as film 18, polyurethane as foam 16 and either wool, polyester or polyamide as fabric 12, a temperature of between 138° C. (280° F.) and 160° C. (320° F.) has been found ideal.

After preheating, hot cloth 10 is inserted in female mold portion 28 as illustrated in FIG. 3. A hollow chamber lies directly beneath the outer contours of mold 28 to which the cloth must conform. Pin holes pass through the outer contours so that the chamber communicates with the outside environment. A vacuum is applied to the chamber, thus drawing cloth 10 placed over mold 28 onto the outer contours, as illustrated in FIG. 4. To insure that cloth 10 does perfectly conform to the contours of mold 28, more pin holes must be located near sharply varying contours of mold 28 than in the more flat portions of mold 28.

Cloth 10 must be heat set in mold 28 to maximize its ability to retain its shape after the molding process. To this end, mold 28 must be heated to the heat set temperature when cloth 10 is drawn therein. A temperature of 149° C.–182° C. (300°–360° F.) has been found advantageous in the preferred embodiment. Cloth 10 is then transferred to a cooler mold 29 (see FIG. 5) to enable the temperature of cloth 10 to drop at least 17°–27° C. (30°–50° F.) to finish the setting process. After the temperature of cloth 10 has been raised to 160° C. and then cooled at least 17° C., the stitch in fabric 12 is set in the shape of molds 28 and 29, and therefore, cloth 10 is less likely to lose its shape after it is removed from the mold. Also, since cloth 10 is pressed against the mold walls while it is heated, the molding process finishes fabric 12.

Foam 20 may then be poured into mold 29 in its liquid state. Cold cure, polyether-type polyurethane foam may be employed, although any foam that adheres to film layer 18 may be used. For example, a rigid or structural foam may be employed, in which case the product may be used as a seat back, an arm rest, interior molding, or the like. Since a cold cure foam is used in the preferred embodiment, it is desirable that female mold 29 have a temperature below 38° C. (about 100° F.).

Male mold portion 32 is then placed over female portion 29 as illustrated in FIG. 6. After approximately 15 minutes foam 20 has fully expanded within the mold. The finished product may then be extracted from female mold portion 29 as illustrated in FIG. 7.

As indicated above, the ease of molding cloth 10 depends largely on the material used as fabric 12 and the intricacy of mold 28. With the process described above, relatively inelastic fabrics and complex molds may be employed. Specifically, the use of the process of the present invention enables cloth to be molded that has never been successfully molded before. Also, the present invention permits the use of molds of greater complexity than has ever been successfully used. In fact, the process is so effective that the preheating step may be eliminated if the mold pattern is relatively simple or an elastic fabric, such as those having a base of texturized polyamide or polyester, is employed. In addition, if a simple mold is employed or the fabric is elastic, the fabric may be finished in the typical fashion.

In addition, a pattern may be applied to the surface of mold 28 which contacts cloth 10. The pattern may be according to a known cloth texture or even a texture that is impossible to weave or knit. Cloth 10 will take on this fine pattern and appear similar to the cloth the mold was patterned after. For example, smooth knit material can be given the appearance of a Harris Tweed, or even burlap.

Obviously, as the texture of the material changes, not only the appearance, but also the feel and acoustical qualities of the cloth change. These other characteristics may be advantageous in certain applications.

Instead of altering the surface of mold 28, a pattern may be applied to the surface of mold 28 by modifying mold 28 to accept inlays containing the various patterns. In this case, the same mold could be used to apply any number of patterns.

This use of inlays greatly increases the flexibility of the molding process. In addition to creating inlays corresponding to fabric patterns, almost anything can be placed in the mold as an inlay. Wire mesh can be placed in the mold to produce a rectangular or diamond pattern. If a case for an instrument or tool is being molded, the actual instrument or tool can be placed in the mold, so that a recess is formed having the shape of the object to be inserted therein.

The following specific examples will serve to illustrate the cloth molding process of this invention. In all examples, fabric 12 was not subjected, during production, to a temperature high enough to set the stitch of the fabric. Therefore, in all examples, the final heat-fixing of fabric 12 occurs in the mold.

EXAMPLE 1

A moldable cloth was prepared by flame-bonding a double knit polyamide fabric to an elastic composition substrate. The fabric was made of texturized stretch yarn that had been piece dyed after knitting. The elastic composition substrate included an open cell polyester-type polyurethane foam layer which had been cast or laid on a polyvinyl chloride film layer. The foam had between 90 and 100 pores per cubic inch, a density of 33 Kg/m³ and a tensile strength of 300% elongation before breaking. The thickness of the foam was 3 mm. The film had a thickness of 0.3 mm and the following composition (% by weight):
Vinyl chloride: 50.0–55.0
Phosphate/phthalate plasticizers: 35.0–40.0
Light/heat stabilizers: 2.0
Epoxy: 0.5
Fillers/pigments: 7.5

On either side of the polyvinyl chloride layer was a layer of hydrolytically stable urethane to improve the adhesion between the poured-in-place polyurethane foam and the polyvinyl chloride. The thickness of the urethane film between the fabric and the polyvinyl chloride was 20 microns, and the thickness of the film between the polyvinyl chloride and the poured-in-place polyurethane foam was 6 microns.

A seat cushion was made, employing this cloth, by first cutting the cloth to the required size, placing it in a frame, and heating it with radiant heat to a temperature of 160° C. (320° F.). While the cloth was still hot, it was drawn into the female portion of a mold by means of a vacuum between the mold and the cloth. The cloth readily conformed to the contours of the mold. The mold had been heated to a temperature of 171° C. (340° F.). The heat of the cloth in the mold was sufficient to set the stitch of the fabric, and set the film.

The cloth was then transferred to a female mold heated to 37° C. (99° F.). Placing the hot cloth in the hot mold, followed by transfer to the cooler mold was sufficient to set the stitch of the fabric and the elastic composition layer to the shape of the mold. A polyether-type polyurethane foam with a density of 52 Kg/m³ was then poured-in-place. The male portion of the mold was placed over the female portion and the foam was permitted to expand for fifteen minutes. The product was then removed from the mold. Thereafter, the poured polyurethane cells were broken by pressure, and the product, a molded, poured-in-place cushion, was complete.

EXAMPLE 2

A moldable cloth was prepared in the same manner as in Example 1 except that the fabric was yarn dyed. The polyurethane foam of the elastic composition substrate had a density of 35 Kg/m³ and a thickness of 1.5 mm. Also, the thickness of the polyvinyl chloride film was 0.15 mm.

A seat cushion was made employing this cloth by cutting the cloth to size, placing the cloth in a frame and heating it by radiant heat to a temperature of 149° C. (300° F.). The heated cloth was then drawn into the female portion of a mold preheated to a temperature of 166° C. (330° F.) under vacuum. The cloth readily conformed to the contours of the mold.

The cloth was then transferred to a female mold heated to 38° C. (100° F.). Placing the hot cloth in the hot mold, followed by transfer to the cooler mold was sufficient to set the stitch of the fabric and the elastic composition layer to the shape of the mold. A polyether-type polyurethane foam, with a density of 52 Kg/m³ was then poured-in-place. The male portion of the mold was fitted over the female portion and the foam was allowed to expand within the mold for fifteen minutes. After removal of the product, the cells of the poured-in-place polyurethane foam were broken by pressure, and the product, a molded, poured-in-place seat cushion was complete.

EXAMPLE 3

A moldable cloth was prepared in the same manner as Example 1 except for the following differences. A yarn dyed double knit fabric having a polyamide base and a wool face was employed. The density of the polyurethane foam layer of the elastic composition substrate was 30 Kg/m³. The thickness of the polyvinyl chloride film was 0.2 mm.

The procedure of Example 1 was employed to form a seat cushion from the cloth, except for the following differences. The cloth was preheated by radiant heat to a temperature of 157° C. (315° F.). The female portion of the mold had been preheated to a temperature of 160° C. (320° F.). The cloth was then transferred to a female mold heated to 38° C. (100° F.).

EXAMPLE 4

A moldable cloth was prepared as in Example 2 except for the following differences. A double knit polyamide and polyester combination fabric was employed. The density of the polyurethane foam layer of the elastic composition layer was 30 Kg/m³. The thickness of the polyvinyl chloride film was 0.25 mm.

The cloth was employed in the process of Example 2 for making a seat cushion except for the following differences. The female mold was preheated to a temperature of 171° C. (340° F.). After the cloth was placed in the hot mold, the cloth was then transferred to a female mold heated to 37° C. (98° F.).

EXAMPLE 5

A moldable cloth was prepared in a manner similar to Example 3, except for the following differences. A piece dyed, single knit polyamide fabric was employed. The thickness of the polyurethane foam layer of the elastic composition substrate was 0.15 mm.

This cloth was utilized to mold a seat cushion in a manner similar to that of Example 3 except for the following differences. The cloth was preheated to a temperature of 149° C. (300° F.). The mold was preheated to a temperature of 168° C. (335° F.).

Although only a few exemplary embodiments of this invention have been described in detail above, those skilled in the art will readily appreciate that many modifications are possible in the exemplary embodiments without materially departing from the novel teachings and advantages of this invention. For example, the cloth may be drawn into the male portion of the mold.

Accordingly, all such modifications are intended to be included within the scope of this invention as defined in the following claims.

What is claimed is:

1. A process for molding cloth comprising the steps of:
   drawing the cloth into a heated mold, the cloth including a fabric layer having a fiber heat-fixable at a set temperature, and an elastic composition layer bonded to the fabric layer, the temperature of the mold being at least the heat-fixable fiber set temperature;
   heating the cloth to at least the heat-fixable fiber set temperature, including the step of transferring energy from the heated mold to the cloth;
   transferring the cloth into a mold having a temperature less than the fiber set temperature; and
   cooling the cloth, the process heat-fixing the heat-fixable fiber of the cloth to the shape of the mold.

2. A process for molding cloth comprising the steps of:
   applying a pattern to a mold surface;
   heating said mold;
   drawing the cloth into said heated mold, the cloth including a fabric layer having a fiber heat-fixable at a set temperature, and an elastic composition layer bonded to the fabric layer, the elastic composition layer including a thermoplastic film layer, the temperature of the mold being at least the greater of the heat-fixable fiber set temperature and the film layer softening temperature;
   heating the cloth to at least the greater of the heat-fixable fiber set temperature and the film layer softening temperature, including the step of transferring energy from the heated mold to the cloth; and
   cooling the cloth, the process heat-fixing the heat-fixable fiber and the film layer to the shape of the mold.

3. A process for molding cloth comprising the steps of:
   applying a pattern to a mold surface;
   heating the mold;
   drawing the cloth into the heated mold, the cloth including a fabric layer having a fiber heat fixable at a set temperature, and an elastic composition layer composition including a flexible foam layer and a thermoplastic mold being at least the greater of the heat-fixable fiber set temperature and the film layer softening temperature;
   heating the cloth to at least the greater of the film layer softening temperature and the heat-fixable fiber set temperature including the step of transferring energy from the heated mold to the cloth;
   transferring the cloth into a mold having a temperature less than the lower of the heat-fixable fiber set temperature and the film layer softening temperature; and
   cooling the cloth, the process heat-fixing the heat-fixable fiber and the film layer to the shape of the mold.

4. A process as in claim 1, 2 or 3 further comprising the step of preheating the cloth prior to the drawing step.

5. A process as in claim 2 or 3 wherein said applying step further comprises the step of inserting an inlay in the mold.

6. A process as in claim 2 or 3 wherein said applying step further comprises the step of roughening the surface of the mold to form the pattern.

7. A process for forming a cloth-covered item comprising the steps of:
   drawing the cloth into a heated mold, the cloth including a fabric layer having a fiber heat-fixable at a set temperature, and an elastic composition layer bonded to the fabric layer, the temperature of the mold being at least the heat-fixable fiber set temperature;
   heating the cloth to at least the heat-fixable fiber set temperature, including the step of transferring energy from the heated mold to the cloth;
   transferring the cloth into a mold having a temperature less than the heat-fixable fiber set temperature;
   cooling the cloth; and
   pouring a liquid foam composition into the mold, the process heat-fixing the heat-fixable fiber of the cloth to the shape of the mold and filling the back side of the molded cloth with foam.

8. A process for molding cloth comprising the steps of:
   bonding a flexible foam layer to a thermoplastic film layer, the foam layer and film layer forming an elastic composition layer;
   bonding the foam layer to a fabric layer having a fiber heat-fixable at a set temperature, the cloth comprising the foam layer, film layer and fabric layer;
   preheating the cloth to at least the greater of the film layer softening temperature and fiber set temperature;
   drawing the cloth into a heated mold, the temperature of the mold being at least the greater of the film layer softening temperature and the fabric layer set temperature;
   heating the cloth in the mold to at least the greater of the film layer softening temperature and the fiber set temperature, including the step of transferring energy from the heated mold to the cloth;
   transferring the cloth in a mold having a temperature less than the lower of the film layer softening temperature and the fabric layer set temperature; and
   cooling the cloth, the process heat-fixing the heat-fixable fiber of the fabric layer and the film layer to the shape of the mold.

9. A process as in claim 1, 2, 7 or 8 wherein the drawing step includes the step of creating a vacuum between the cloth and the mold to thereby conform the cloth to the shape of the mold.

10. A process as in claim 1, 2, 3 or 8 further comprising the step of pouring rigid foam into the mold after the cooling step.

11. A process for forming cloth-covered items comprising the steps of:
    bonding a flexible foam layer to a thermoplastic film layer, the foam layer and film layer forming an elastic composition layer;
    bonding the foam layer to a fabric layer having a fiber heat-fixable at a set temperature, the cloth comprising the foam layer, the film layer and the fabric layer;
    preheating the cloth to a temperature of at least the greater of the heat-fixable fiber set temperature and the film layer softening temperature;
    drawing the cloth into a heated mold, the temperature of the mold being at least the greater of the heat-fixable fiber set temperature and the film layer softening temperature;
    heating the cloth to at least the greater of the film layer softening temperature and the heat-fixable fiber set temperature, including the step of transferring energy from the heated mold to the cloth;
    transferring the cloth into a mold having a temperature less than the lower of the fiber set temperature and the film layer softening temperature;
    cooling the cloth; and
    pouring a liquid foam composition into the mold, the process heat-fixing the heat-fixable fiber of the fabric layer and the film layer to the shape of the mold and filling the back side of the molded cloth with foam.

12. A process as in claim 7 or 11 further comprising the step of applying a pattern to the mold surface.

13. A process as in claim 10 wherein said applying step further comprises the step of inserting an inlay in the mold.

14. A process as in claim 10 wherein said applying step further comprises the step of roughening the surface of the mold to form the pattern.

* * * * *